(12) United States Patent
Inui et al.

(10) Patent No.: US 10,691,003 B2
(45) Date of Patent: Jun. 23, 2020

(54) PROJECTION TYPE IMAGE DISPLAY APPARATUS

(71) Applicant: MAXELL, LTD., Kyoto (JP)

(72) Inventors: Shinro Inui, Kyoto (JP); Hiroshi Oshima, Kyoto (JP)

(73) Assignee: MAXELL, LTD., Kyoto (JP)

(*) Notice: Subject to any disclaimer, the term of this patent is extended or adjusted under 35 U.S.C. 154(b) by 212 days.

(21) Appl. No.: 15/767,839

(22) PCT Filed: Oct. 15, 2015

(86) PCT No.: PCT/JP2015/079200
§ 371 (c)(1),
(2) Date: Apr. 12, 2018

(87) PCT Pub. No.: WO2017/064794
PCT Pub. Date: Apr. 20, 2017

(65) Prior Publication Data
US 2018/0314138 A1 Nov. 1, 2018

(51) Int. Cl.
*G02B 21/14* (2006.01)
*G03B 21/14* (2006.01)
*G02B 7/02* (2006.01)

(52) U.S. Cl.
CPC .......... *G03B 21/142* (2013.01); *G02B 7/023* (2013.01)

(58) Field of Classification Search
CPC .............................. G02B 7/023; G03B 21/142
See application file for complete search history.

(56) References Cited

U.S. PATENT DOCUMENTS

2004/0114115 A1* 6/2004 Runco ................... G02B 7/023
353/101
2014/0253818 A1 9/2014 Ono et al.

FOREIGN PATENT DOCUMENTS

| JP | 2010-256388 A | 11/2010 |
| JP | 2013-254061 A | 12/2013 |
| WO | 2013/054426 A1 | 3/2015 |

OTHER PUBLICATIONS

International Search Report for WO 20171064794 A1, dated Jan. 12, 2016.
Chinese Office Action dated Nov. 5, 2019 for the Chinese Patent Application No. 201580083838.4.

* cited by examiner

*Primary Examiner* — Joseph P Martinez
*Assistant Examiner* — Vipin Patel
(74) *Attorney, Agent, or Firm* — Volpe and Koenig, P.C.

(57) ABSTRACT

Provided is a technique capable of achieving a manually-operated lens shift mechanism in a space-saving manner in regard to a projection type image display apparatus. The lens shift mechanism includes a first base, a second base, a third base to which a projection lens is fixed, a first shift portion moves the projection lens in a vertical direction by moving the second base in the vertical direction with respect to the first base, and a second shift portion which moves the projection lens in a horizontal direction by moving the third base in the horizontal direction with respect to the second base. The first shift portion is arranged along the vertical direction to be coaxial with a first manual operation portion and a first rotation shaft. The second shift portion is arranged along the vertical direction to be coaxial with a second manual operation portion and a second rotation shaft.

2 Claims, 13 Drawing Sheets

10: LENS SHIFT MECHANISM
11: FIRST SHIFT PORTION
12: SECOND SHIFT PORTION

110: FIRST BASE
120: SECOND BASE
130: THIRD BASE
140: BIASING SCREW PORTION

30: HOLE
51: FIRST KNOB
52: SECOND KNOB
61: FIRST SHAFT
62: SECOND SHAFT
71: FIRST LEADSCREW PORTION
72: SECOND LEADSCREW PORTION
81: COUPLING PORTION
82: LINKING PORTION

FIG. 6
(A)
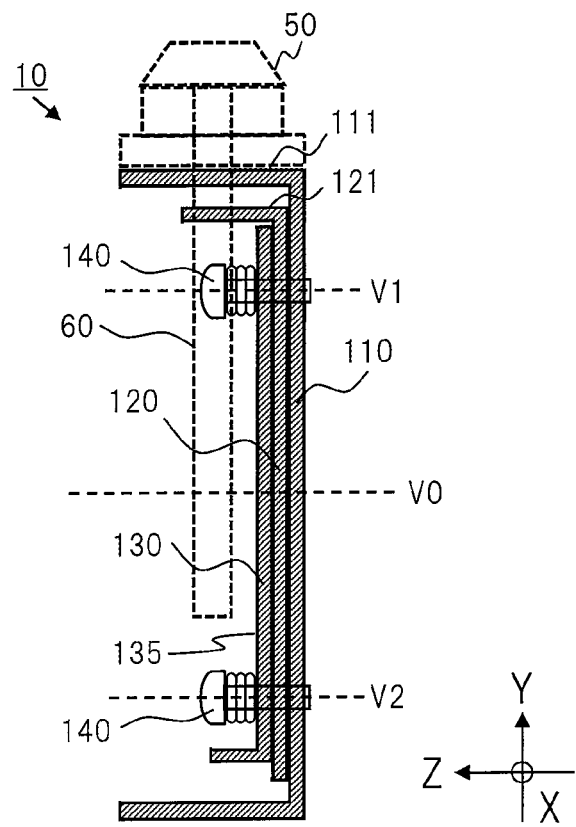
(B)
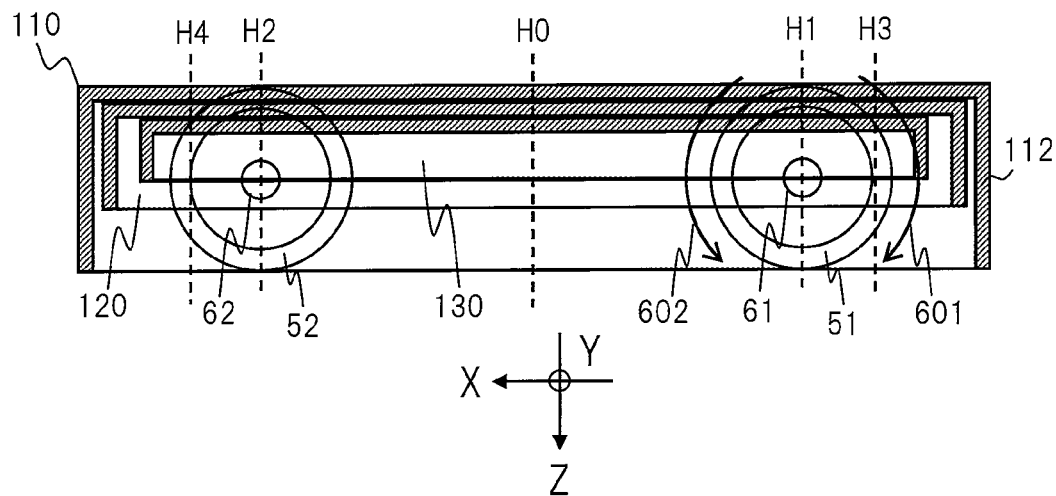

FIG. 13
(A)
NORMAL STATE
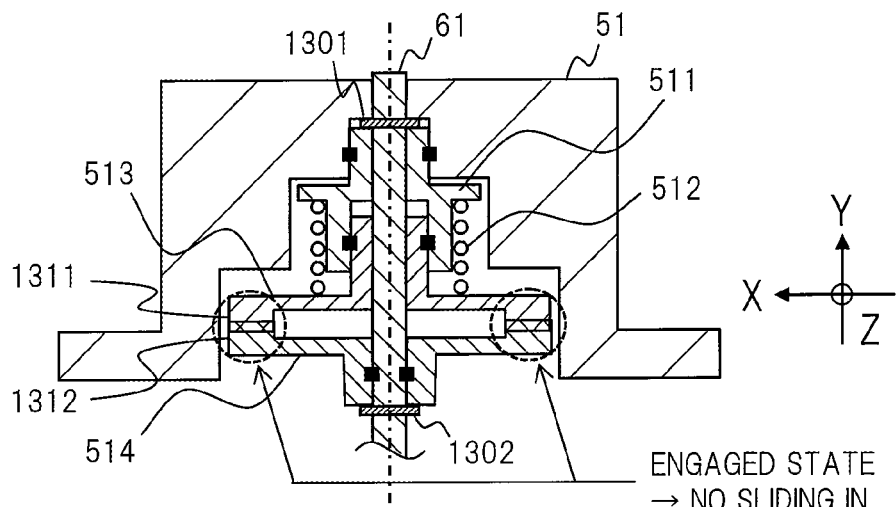
■ : NO SLIDING IN ROTATION DIRECTION
ENGAGED STATE
→ NO SLIDING IN
  ROTATION DIRECTION
(B)
OVERLOAD STATE
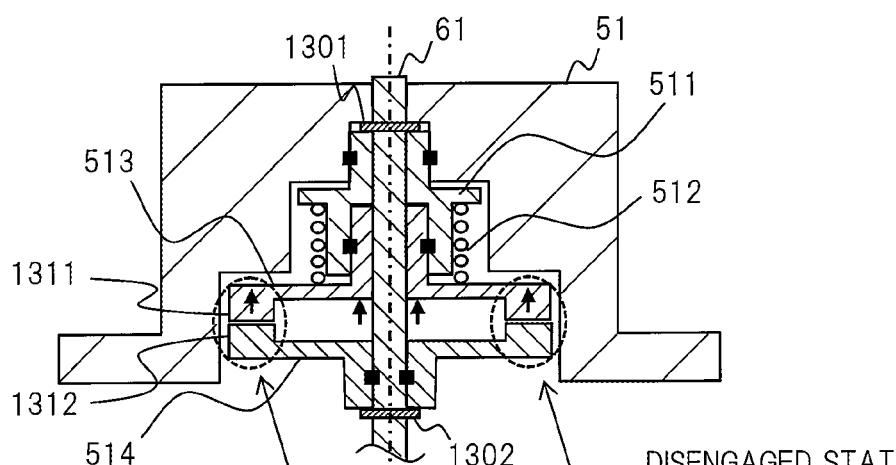
DISENGAGED STATE
→ SLIDING OCCURS IN
  ROTATION DIRECTION

PROJECTION TYPE IMAGE DISPLAY APPARATUS

TECHNICAL FIELD

The present invention relates to a projection type image display technique. In addition, the present invention relates to a lens shift mechanism of a projection lens.

BACKGROUND ART

A projection type image display apparatus such as an LCD projector occasionally comprises a lens shift mechanism in its projection optical system. The lens shift mechanism is a mechanism that moves a projection lens so as to shift the projection lens in vertical and horizontal directions which are directions orthogonal to an optical axis in order to adjust the image display position on the screen. With a lens shift function using this lens shift mechanism, a degree of freedom on installing the projection type image display apparatus can be increased.

In a manual-type lens shift mechanism, a knob or the like is provided on a housing of the apparatus as a manual operation portion. A member or the like for converting a rotational force into a vertical or horizontal force and transmitting its force is provided with respect to a rotation shaft of the knob. When the knob is turned, the projection lens moves in the vertical or horizontal direction through this mechanism.

Japanese Patent Application Laid-Open Publication No. 2010-256388 (Patent Document 1) is cited as an example of a prior art in regard to a lens shift mechanism. Patent Document 1 has described a lens shift apparatus of an optical device in which miniaturization is achieved by the use of common members. This lens shift apparatus comprises a manual operation portion, a guide mechanism portion, and a motion transmitting mechanism portion. The motion transmitting mechanism portion converts a shift in a rotational action of the manual operation portion into a movement, so that a lens support portion shifts in the horizontal or vertical direction along the guide mechanism portion. The motion transmitting mechanism portion comprises a clutch mechanism portion that cuts off the transmitting mechanism when a rotational torque of the manual operation portion exceeds a predetermined value, thereby causing the manual operation portion to idly rotate.

RELATED ART DOCUMENTS

Patent Documents

Patent Document 1: Japanese Patent Application Laid-Open Publication No. 2010-256388

SUMMARY OF THE INVENTION

Problems to be Solved by the Invention

In a manual-type lens shift mechanism, mechanical members are subjected to a large stress when a rotational torque of the manual operation portion is too large, that is, when the user attempts to turn the manual operation portion beyond its limit position, thereby causing breakage or the like. Therefore, it is desirable for this lens shift mechanism to comprise the so-called clutch mechanism, in other words, a torque limiter mechanism in order to prevent breakage or the like.

The manual-type lens shift mechanism of the conventional projection type image display apparatus has components including the clutch mechanism arranged at positions that are not coaxial with the rotation shaft of the manual operation portion, that is, at positions away from rotation shaft in a direction orthogonal to the rotation shaft. For this reason, the conventional mechanism occupies a large space inside the housing, thereby causing the size of the apparatus to increase accordingly. In addition, the conventional mechanism is complex and has a comparatively large number of components, thereby causing the cost of the apparatus to increase accordingly.

The lens shift apparatus described in Patent Document 1 has a mechanism portion for a vertical movement and another mechanism portion for a horizontal movement. The mechanism portion for the vertical movement has a first transmitting gear provided on the rotation shaft of the manual operation portion, a second transmitting gear engaged with the first transmitting gear, a worm gear on an outer periphery of a central axis of the second transmitting gear, and a nut portion to which the worm gear is screwed so as to allow the worm gear to rectilinearly shift in the vertical direction. In other words, members such as the gears and the nut portion are arranged at positions not coaxial with the rotation shaft of the manual operation portion. The clutch mechanism is constituted by the second transmitting gear and the worm gear. Likewise, the mechanism portion for the horizontal movement has a first gear, a second gear, a cam mechanism portion, and the like, and members such as the gears and the cam are arranged at positions not coaxial with the rotation shaft of this manual operation portion. This clutch mechanism is constituted by the first gear and the second gear.

An object of the present invention is to provide a technique capable of achieving a manual-type lens shift mechanism in a space-saving manner in regard to a projection type image display apparatus, thereby making it possible to achieve a compact and low-cost apparatus.

Means for Solving the Problems

A representative embodiment of the present invention is a projection type image display apparatus characterized by having the following configuration.

According to one embodiment of the present invention, the projection type image display apparatus comprises: a projection lens; and a lens shift mechanism for moving the projection lens in each of vertical and horizontal directions with respect to an optical axis based on a manual operation of a user, wherein the lens shift mechanism includes: a first base fixed to a housing of the projection type image display apparatus; a second base connected to the first base so as to be relatively movable in the vertical direction with respect to the first base; a third base connected to the second base so as to be relatively movable in the horizontal direction with respect to the second base, and to which the projection lens is fixed; a first shift portion which moves the projection lens in the vertical direction by moving the second base in the vertical direction with respect to the first base based on the manual operation; and a second shift portion which moves the projection lens in the horizontal direction by moving the third base in the horizontal direction with respect to the second base based on the manual operation, the first shift portion is arranged along the vertical direction so as to be coaxial with a first manual operation portion and a first rotation shaft, and the second shift portion is arranged along the vertical direction so as to be coaxial with a second manual operation portion and a second rotation shaft.

Effects of the Invention

According to the representative embodiment of the present invention, the manual-type lens shift mechanism can be achieved in a space-saving manner in regard to the projection type image display apparatus, thereby making it possible to achieve a compact and low-cost apparatus.

BRIEF DESCRIPTION OF THE DRAWINGS

FIGS. 6(A) and 6(B) are schematic views each showing a stacked state of bases of the lens shift mechanism according to the embodiment, as seen from the X and Y directions;

FIGS. 13(A) and 13(B) are cross-sectional views each showing a configuration of a clutch mechanism of the lens shift mechanism according to the embodiment.

DETAILED DESCRIPTION OF PREFERRED EMBODIMENTS

A projection type image display apparatus according to an embodiment of the present invention will be described with reference to FIGS. 1 to 13. Note that, in all of the drawings used to describe the embodiment, the same members are generally denoted by the same reference signs, and redundant descriptions thereof are omitted as appropriate.

[Projection Type Image Display Apparatus]

Figure 1:
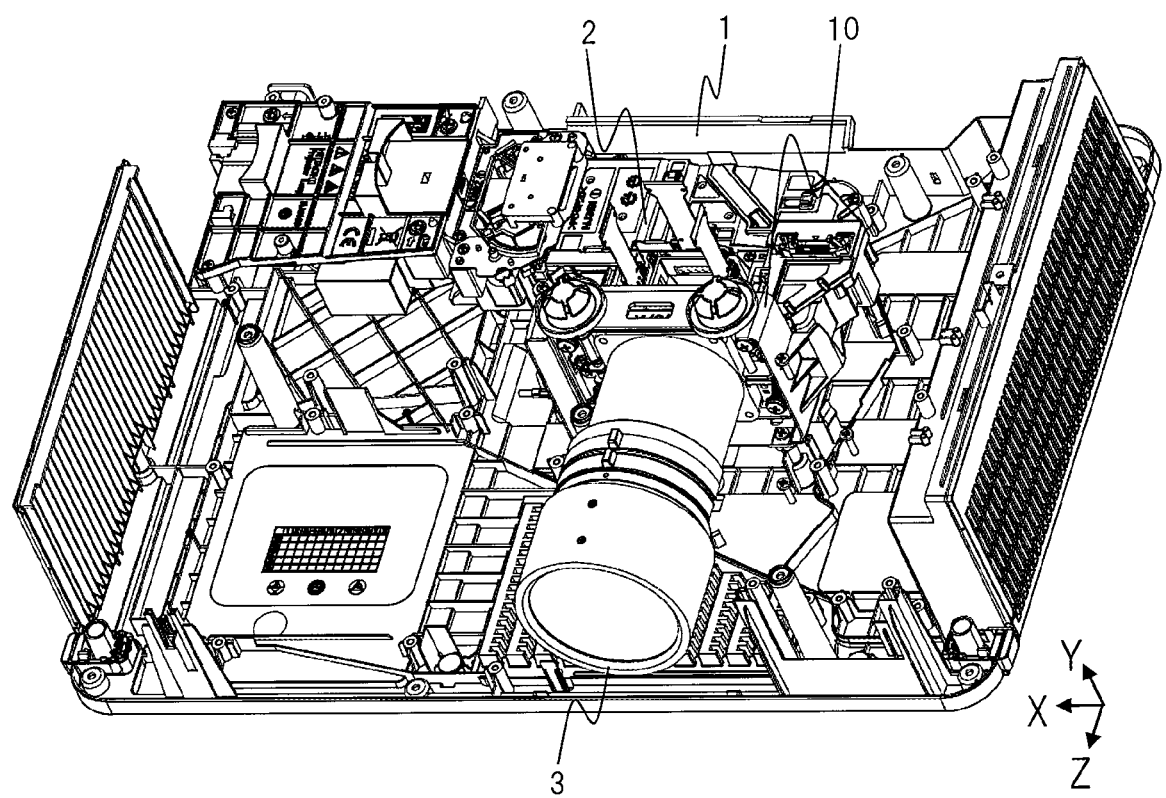
FIG. 1 is a diagram showing a configuration of a projection type image display apparatus according to an embodiment of the present invention.

FIG. 1 is a diagram showing a configuration of the entire projection type image display apparatus according to the embodiment and is a perspective view showing an internal configuration of the projection type image display apparatus in a state where an upper cover of a housing 1 of the apparatus is removed. The projection type image display apparatus of the embodiment is an LCD projector. The projection type image display apparatus has the housing 1 in which an optical engine 2, a projection optical system 3, and the like serving as components of the optical system are housed. The housing 1 is a rectangular parallelepiped shaped box. Other components such as a power supply unit, a cooling unit, an image signal circuit, and a control circuit that are not shown are housed in the housing 1.

The optical engine 2 is composed so as to include a light source and, for example, a liquid-crystal panel as a display element. The optical engine 2 is an optical unit used for forming an image by projecting light emitted from the light source to the display element.

The projection optical system 3 includes a projection lens, and is a unit used for enlarging the image formed by the display element of the optical engine 2 and projecting the image toward a screen. The projection optical system 3 comprises a lens shift mechanism 10.

Note that, in this specification, a direction f an optical axis of the light projected from the projection lens of the projection optical system 3 is described as a Z direction. As directions orthogonal to the Z direction, a horizontal direction is described as an X direction, and a vertical direction is described as a Y direction.

[Optical Engine]

Figure 2:
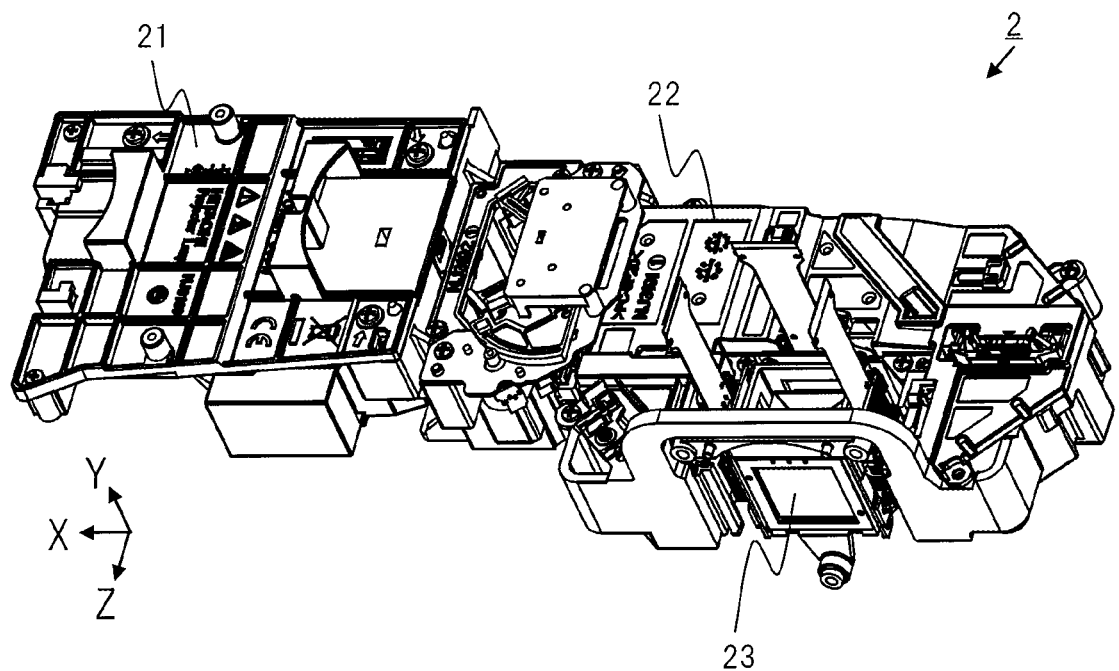
FIG. 2 is a diagram showing a configuration of an optical engine of the projection type image display apparatus according to the embodiment.

FIG. 2 is a perspective view showing a configuration of the optical engine 2. The optical engine 2 has a light source portion 21, a color separating optical system 22, and a color combining optical system 23. The light source portion 21 has an ultra-high-pressure mercury lamp as the light source and emits a substantially white light. An LED, a laser, or the like is also applicable as the light source. The color separating optical system 22 separates the substantially white light into three primary colors of light of RGB and guides each color to the corresponding liquid-crystal panel. The color combining optical system 23 has liquid-crystal panels for each color of RGB and a cross-dichroic prism. The liquid-crystal panel can be either a transmissive-type panel or a reflective-type panel. A digital micromirror device (DMD) or the like is also applicable as the display element. The color combining optical system 23 forms images based on each RGB signal and combines the images of each color. Light is emitted from the color combining optical system 23 in the Z direction.

[Projection Optical System (1)]

Figure 3:
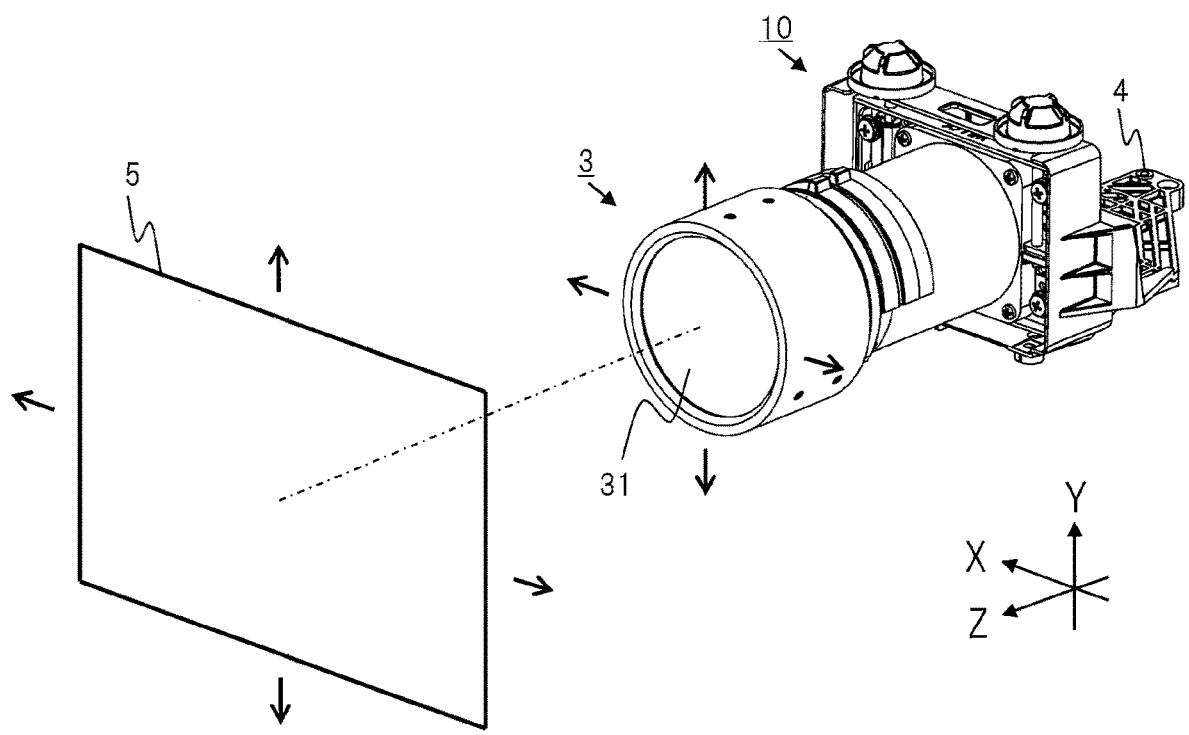
FIG. 3 is a diagram showing configurations of an entire projection optical system, a screen, and the like of the projection type image display apparatus according to the embodiment.

FIG. 3 is a perspective view showing the entire projection optical system 3, a screen 5, and a movement of the lens shift mechanism 10. The screen 5 on which the image is projected is indicated by a rectangular X-Y planar portion. The projection optical system 3 has a substantially cylindrical projection lens 31 on its front side facing the screen 5 in the Z direction and the lens shift mechanism 10 to which the projection lens 31 is connected on its rear side. The projection lens 31 is fixed to a front side of a planar portion of the lens shift mechanism 10 in the Z direction. The lens shift mechanism 10 is fixed to a common base 4.

The image light emitted from the color combining optical system 23 of the optical engine 2 of FIG. 2 in the Z direction passes through the lens shift mechanism 10 of FIG. 3 and enters the projection lens 31. This image light is enlarged by the projection lens 31 and is projected onto the screen 5.

The lens shift mechanism 10 is a manual-type mechanism that moves the projection lens 31 so as to shift the projection lens 31 in the vertical and horizontal directions based on a manual operation of the user. Thus, the position of the image projected onto the screen 5 can be moved and adjusted in each of the vertical and horizontal directions.

[Projection Optical System (2)]

Figure 4:
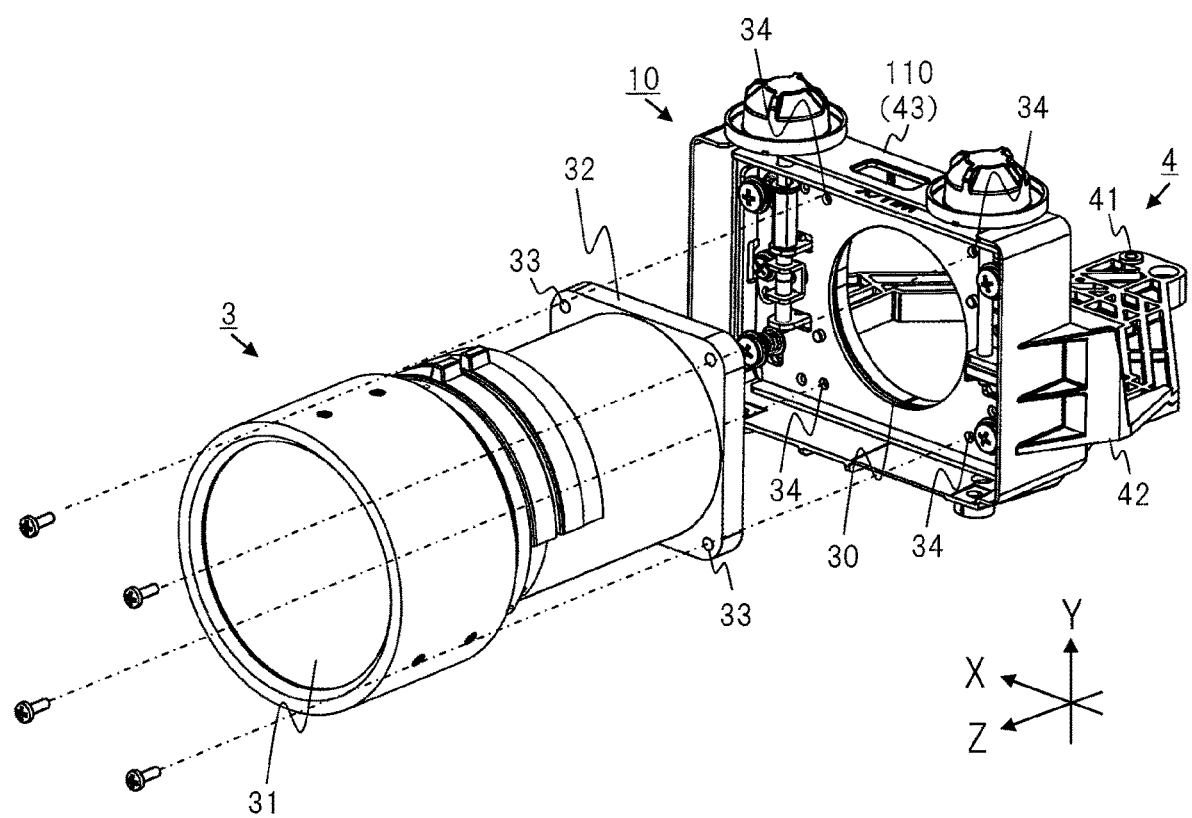
FIG. 4 is a perspective view showing a state where the projection optical system according to the embodiment is disassembled into a projection lens and a lens shift mechanism.

FIG. 4 is a perspective view showing a state where the projection optical system 3 of FIG. 3 is disassembled into the projection lens 31 and the lens shift mechanism 10. The lens shift mechanism 10 is constituted by a substantially rectangular frame-like plate and is provided with a circular hole 30 at a center position of an X-Y planar portion of the plate. The projection lens 31 is attachable to the front of the X-Y planar portion with respect to this hole 30 in the Z direction. The hole 30 allows the image light from the optical engine 2 to pass therethrough.

The projection lens 31 has a flange 32 at an end portion of its lens barrel. The flange 32 is fixed to the X-Y planar portion with respect to the hole 30 on the plate of the lens shift mechanism 10. More specifically, holes 33 for fixing the flange 32 with screws are formed on four corners of the flange 32. Screw holes 34 for fixing the flange 32 with screws are formed at four corresponding positions around the hole 30 on the X-Y planar portion of the lens shift mechanism 10. The flange 32 of the projection lens 31 is fixed to the plate of the lens shift mechanism 10 with screws inserted into the holes 33 on the flange 32 and the screw holes 34 on the plate.

The common base 4 is fixed to the housing 1. The common base 4 has an optical engine mounting portion 41, a seating portion 42, and a fixing base 43. The optical engine mounting portion 41 is provided in a region behind the lens shift mechanism 10 in the Z direction, at a center of the lens shift mechanism 10 in the X direction, and at a lower position of the lens shift mechanism 10 in the Y direction. The optical engine mounting portion 41 is fixed to the housing 1, and a portion of the optical engine 2 is mounted on the optical engine mounting portion 41 in the Y direction and is fixed thereto. The seating portion 42 is a portion divided into two parts in the Z direction from the optical engine mounting portion 41, and the two parts are connected to the fixing base 43. The fixing base 43 is a frame-like portion having a rectangular X-Y planar portion and is also a component of the lens shift mechanism 10. The left and right sidewalls of the fixing base 43 in the Y direction are fixed so as to be grasped by the seating portion 42. In the embodiment, the housing 1, the optical engine mounting portion 41, the seating portion 42, and the fixing base 43 are composed as an integral member. However, the members may be composed as separate members that are connected to each other.

[Lens Shift Mechanism (1)_General]

Figure 5:
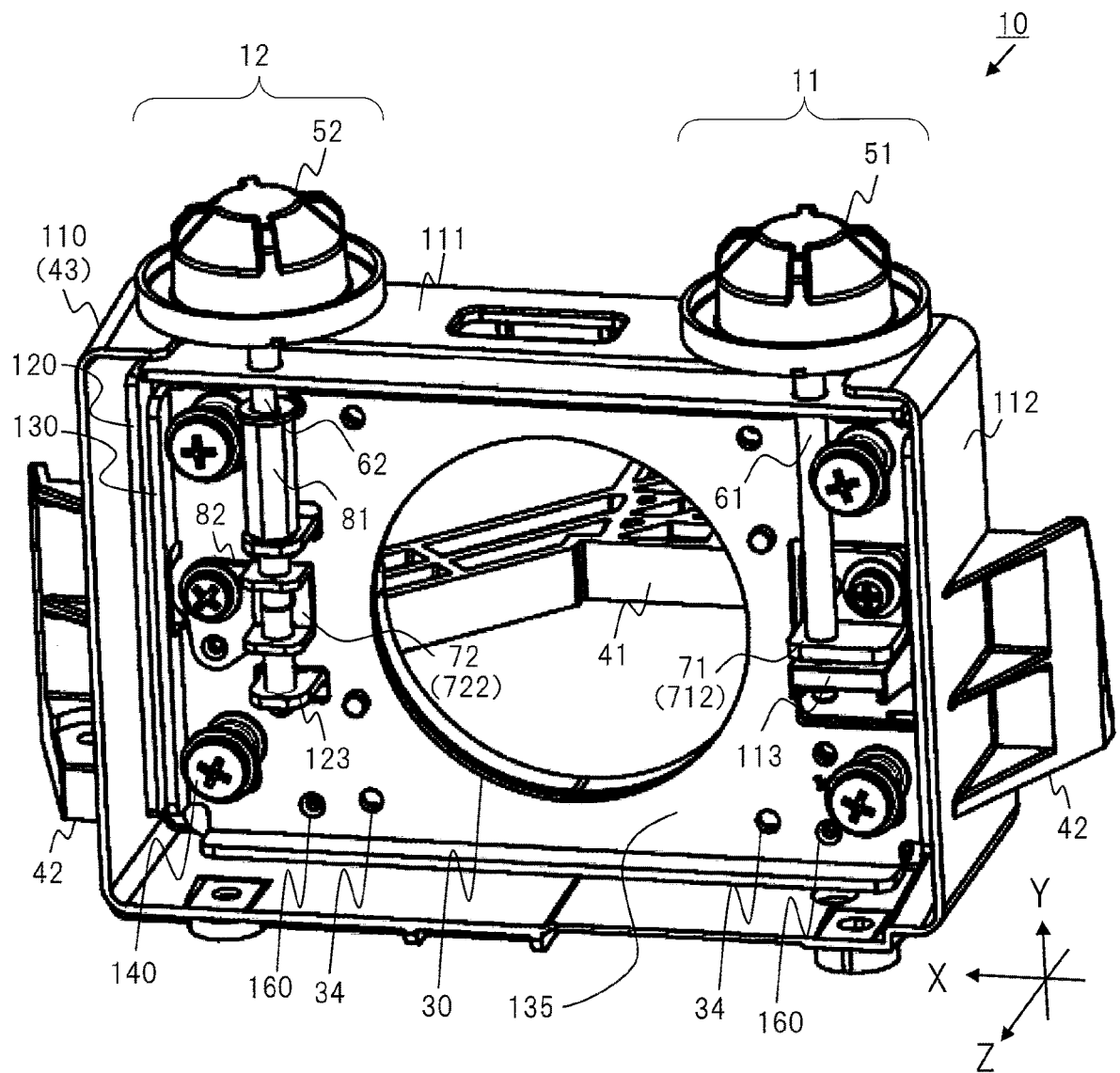
FIG. 5 is a perspective view showing a configuration of the lens shift mechanism according to the embodiment.

FIG. 5 is a perspective view showing an entire configuration of the lens shift mechanism 10 of FIG. 4, as seen from the front in the Z direction. The lens shift mechanism 10 has a first base 110, a second base 120, a third base 130, a first shift portion 11, and a second shift portion 12 as its main components.

The first base 110 is the fixing base 43 and is a portion that is fixed to the housing 1 through the common base 4. At the same time, the first base 110 is a portion that becomes a base for moving the projection lens 31. The first base 110 is connected to the second base 120 and the third base 130 such that the second base 120 and the third base 130 are stacked and housed in the first base 110 in the Z direction.

The second base 120 is a vertical base for a vertical movement of the projection lens 31. The second base 120 is connected to the first base 110 so as to be movable in the Y direction with respect to the first base 110.

The third base 130 is a horizontal base for a horizontal movement of the projection lens 31. The third base 130 is connected to the second base 120 so as to be movable in the X direction with respect to the second base 120. The projection lens 31 is fixed to the X-Y planar portion 135 of the third base with respect to the hole 30 at the center position of the X-Y planar portion 135 and moves in the X and Y directions together with the third base 130.

The first base 110, the second base 120, and the third base 130 are each constituted by a substantially rectangular frame-like plate. The first base 110, the second base 120, and the third base 130 are connected to one another so as to be stacked in this order from back to front in the Z direction. This connection is made possible by biasing screw portions 140 or the like on four corners of each plate. Each plate is made of metal, resin, or the like having a predetermined rigidity.

The first shift portion 11 is a vertical shift mechanism portion for a Y-direction movement of the projection lens 31. The first shift portion 11 has a first knob 51, a first shaft 61, a first leadscrew portion 71, a shaft receiving portion 113, and the like as its components.

The second shift portion 12 is a horizontal shift mechanism portion for an X-direction movement of the projection lens 31. The second shift portion 12 has a second knob 52, a second shaft 62, a second leadscrew portion 72, a coupling portion 81, a link portion 82, a shaft receiving portion 123, and the like as its components.

The first shift portion 11 is connected to the first base 110 and the second base 120. The second shift portion 12 is connected to the first base 110, the second base 120, and the third base 130.

The first base 110 has a plate having a rectangular X-Y planar portion that is a main surface and a frame-like portion composed as sidewalls extending in the Z direction from four sides of this plate. The seating portion 42 is fixed to the left and right sidewalls 112 of the first base 110. The bottom sidewall of the first base 110 is fixed to the housing 1. The first knob 51 and the second knob 52 are arranged at two left and right positions in the X direction on the top sidewall 111 of the first base 110.

The biasing screw portions 140 are provided on the four corners of the X-Y planar portion of each plate of the first base 110, the second base 120, and the third base 130, such as the X-Y planar portion 135 of the third base 130 shown in FIG. 5. Each of the biasing screw portions 140 is constituted by a screw member, a spring, a through hole, a screw hole, and the like. The biasing screw portions 140 maintain the plates such that the plates are urged in the Z direction by each spring. Each of the vertical guide portions and horizontal guide portions described below are provided at predetermined positions close to the biasing screw portions 140 on the four corners of the plate. Portions of the horizontal guide portions 160 can be seen in FIG. 5. These guide portions are portions that serve as guides when shifting the plates in the vertical and horizontal directions.

The first shift portion 11 and the second shift portion 12 are individually arranged at positions on right and left sides of the X-Y planar portion of the plate in the X direction with respect to the position of the hole 30 at the center of the X-Y planar portion. The main components of the first shift portion 11 are arranged at a first position on the right side of the X-Y planar portion so as to be coaxial with the first shaft 61 of the first knob 51 and extend in the Y direction. The main components of the second shift portion 12 are arranged at a second position on the left side of the X-Y planar portion so as to be coaxial with the second shaft 62 of the second knob 52 and extend in the Y direction. The first position is a position to the right of the hole 30 on the X-Y planar portion and close to the right sidewall. The second position is a position to the left of the hole 30 on the X-Y planar portion and close to the left sidewall.

The first knob 51 and the second knob 52 are manual operation portions that allow the user to hold each of the knobs by hand and turn these knobs in a first rotational direction or a second rotational direction. The first knob 51 and the second knob 52 are arranged so as to be exposed to the outside of the upper cover of the housing 1. The first shaft 61 which is a first rotation shaft extending downward in the Y direction is connected to the first knob 51. The second shaft 62 which is a second rotation shaft extending downward in the Y direction is connected to the second knob 52. A diameter of each knob is greater than a diameter of the corresponding shaft, and each knob and shaft is designed to have diameters corresponding to a predetermined torque transmission ratio.

The first shaft 61 rotates about a central axis together with the rotation of the first knob 51. Likewise, the second shaft 62 rotates about a central axis together with the rotation of the second knob 52. The first knob 51 and the first shaft 61 do not move in the Y direction. Likewise, the second knob 52 and the second shaft 62 do not move in the Y direction.

An upper portion of the first shaft 61 in the Y direction and an upper portion of the second shaft 62 in the Y direction are rotatably supported by shaft receiving portions that are holes or notched portions formed on the top sidewall of each of the first base 110, the second base 120, and the third base 130.

A lower end of the first shaft 61 in the Y direction is rotatably supported by the shaft receiving portion 113 of the first base 110. The shaft receiving portion 113 is a plate-like portion extending in the Z direction from the X-Y planar portion of the first base 110 and is composed so as to be integrally formed with, for example, the first base 110. The shaft receiving portion 113 protrudes to the front of the X-Y planar portion 135 through a hole on the second base 120 and a hole on the third base 130. The lower end of the first shaft 61 is inserted into a hole on the shaft receiving portion 113. The shaft receiving portion 113 may be constituted by a member that is separate from the first base 110 and is fixed to the first base 110 with a screw or the like.

A lower end of the second shaft 62 (second rotation shaft portion 622 described below) in the Y direction is rotatably supported by the shaft receiving portion 123 of the second base 120. The shaft receiving portion 123 is a plate-like portion extending in the Z direction from the X-Y planar portion of the second base 120. The shaft receiving portion 123 protrudes to the front of the X-Y planar portion 135 through a hole on the third base 130. The lower end of the second shaft 62 is inserted into a hole on the shaft receiving portion 123. The shaft receiving portion 123 may be composed so as to be integrally formed with the second base 120 or may be composed as a member separate from the second base 120.

In addition, a lower end of the coupling portion 81 in the Y direction at a position midway of the second shaft 62 is supported by a shaft receiving portion (shaft receiving portion 124 described below) of the second base 120. The shaft receiving portion for the coupling portion 81 is a plate-like portion extending in the Z direction from the X-Y planar portion of the second base 120 and protruding to the front of the X-Y planar portion 135 through a hole on the third base 130.

The first leadscrew portion 71 is provided in a region above the lower end of the first shaft 61 in the Y direction, to the right of the hole 30, and to the left of the right side of the plate. The first leadscrew portion 71 is a first transmitting portion having a function for converting a rotational motion of the first shaft 61 into an upward or downward rectilinear motion in the Y direction and transmitting its force. The first leadscrew portion 71 moves upward or downward in the Y direction together with a rotation of the first shaft 61. The first leadscrew portion 71 is constituted by a male screw portion that is a portion of the first shaft 61 and a female screw member 712 that is a plate-like member having a female screw portion to which the male screw portion is screwed.

The female screw member 712 is constituted by a first planar plate fixed to the X-Y planar portion of the second base 120 with a screw or the like and a second planar plate bent from this first planar plate and extending in the Z direction. The female screw portion is provided at a position on the second planar plate through which the first shaft 61 passes. The second planar plate of the female screw member 712 protrudes to the front of the X-Y planar portion 135 through the hole on the third base 130. The female screw member 712 may be composed so as to be integrally formed with the second base 120. Each of the first leadscrew portion 71 and the second leadscrew portion 72 may be constituted by a ball screw or the like.

The coupling portion 81 is provided at the position midway of the second shaft 62 in the Y direction and in front of the X-Y planar portion 135 of the third base 130. The coupling portion 81 has a function that allows a rotational torque of the second shaft 62 to be transmitted downward in the Y direction. At the same time, the coupling portion 81 has a function for absorbing the Y-direction movement of the third base 130 that occurs together with the Y-direction movement of the second base 120, thereby maintaining positions of the second knob 52 and the like arranged above the coupling portion 81.

The second leadscrew portion 72 is provided in a region midway of the second shaft 62, below the coupling portion 81, above the shaft receiving portion 123, and to the left of the hole 30. The second leadscrew portion 72 is a second transmitting portion having a function for converting a rotational motion of the second shaft 62 into an upward or downward rectilinear motion in the Y direction and transmitting its force. The second leadscrew portion 72 moves upward or downward in the Y direction together with a rotation of the second shaft 62. The second leadscrew portion 72 constituted by a male screw portion that is a portion of the second shaft 62 and a female screw member 722 that is a member having a female screw portion to which the male screw portion is screwed. The female screw member 722 is constituted by a first planar plate parallel to the X-Y planar portion 135 and two second planar plates bent from the first planar plate and extending in the Z direction. The female screw portion is provided at a position on one of the two second planar plates through which the second shaft 62 passes. The first planar plate of the female screw member 722 is connected to a first end portion of the link portion 82.

The link portion 82 is provided in a region to the left of the second leadscrew portion 72 and to the right of the left side of the plate. The link portion 82 is a member for connecting the second leadscrew portion 72 and the third base 130 to each other and is a direction converting portion for converting the upward or downward rectilinear motion of the second leadscrew portion 72 in the Y direction into a left or right rectilinear motion in the X direction and transmitting its force.

In the present embodiment, the link portion 82 is a flat plate-like member having a substantially isosceles-triangular shape and has a rotation supporting shaft, the first end portion, and a second end portion. The rotation supporting shaft of link portion 82 is connected to the second base 120 at a predetermined position on the second base 120 as a rotatable link via a hole on the third base 130. The first end portion to the right of the rotation supporting shaft is arranged behind the first planar plate of the female screw member 722 and is connected to this first planar plate at one point as a rotatable link. The second end portion below the rotation supporting shaft is connected to the third base 130 at one point of a predetermined position as a rotatable link.

[Lens Shift Mechanism (2)_Stacked State]

FIG. 6(A) is a schematic view showing a stacked state of the three plates of the lens shift mechanism 10 that are the first base 110, the second base 120, and the third base 130, as seen from the X direction. In addition, FIG. 6(B) is a schematic view showing the stacked state of the three plates, as seen from the Y direction. The first base 110, the second base 120, and the third base 130 including the area of each X-Y planar portion are designed so as to be smaller in size in this order.

The second base 120 is housed in a frame of the first base 110. The second base 120 is relatively moved in the Y direction by the first shift portion 11 with respect to the first base 110 serving as a reference base. The third base 130 is housed in a frame of the second base 120. The third base 130 is connected to the second base 120, so that the third base 130 basically moves in the Y direction together with the Y-direction movement of the second base 120. The third base 130 is relatively moved in the X direction by the second shift portion 12 with respect to the second base 120.

Thus, the third base 130 moves in the X and Y directions with respect to the first base 110. In other words, the position of the projection lens 31 fixed to the third base 130 can be moved in each of the vertical and horizontal directions by the lens shift mechanism 10.

In FIG. 6(A), a position V0 in the Y direction corresponds to the center position of the X-Y planar portion and the hole 30 on the plate. A position V1 and a position V2 indicate positions on which the biasing screw portions 140 are arranged. A knob 50 corresponding to the first knob 51 or the second knob 52 is arranged on the top sidewall 111 of the first base 110, as indicated by dotted lines. A shaft 60 corresponding to the first shaft 61 or the second shaft 62 is arranged in front of the X-Y planar portion 135 of the third base 130 so as to extend in the Y direction. An upper portion of the shaft 60 in the Y direction is supported by the shaft receiving portion on the top sidewall 111 of the first base 110, the shaft receiving portion on the top sidewall 121 of the second base 120, and the shaft receiving portion on the top sidewall of the third base 130.

Figure 7:
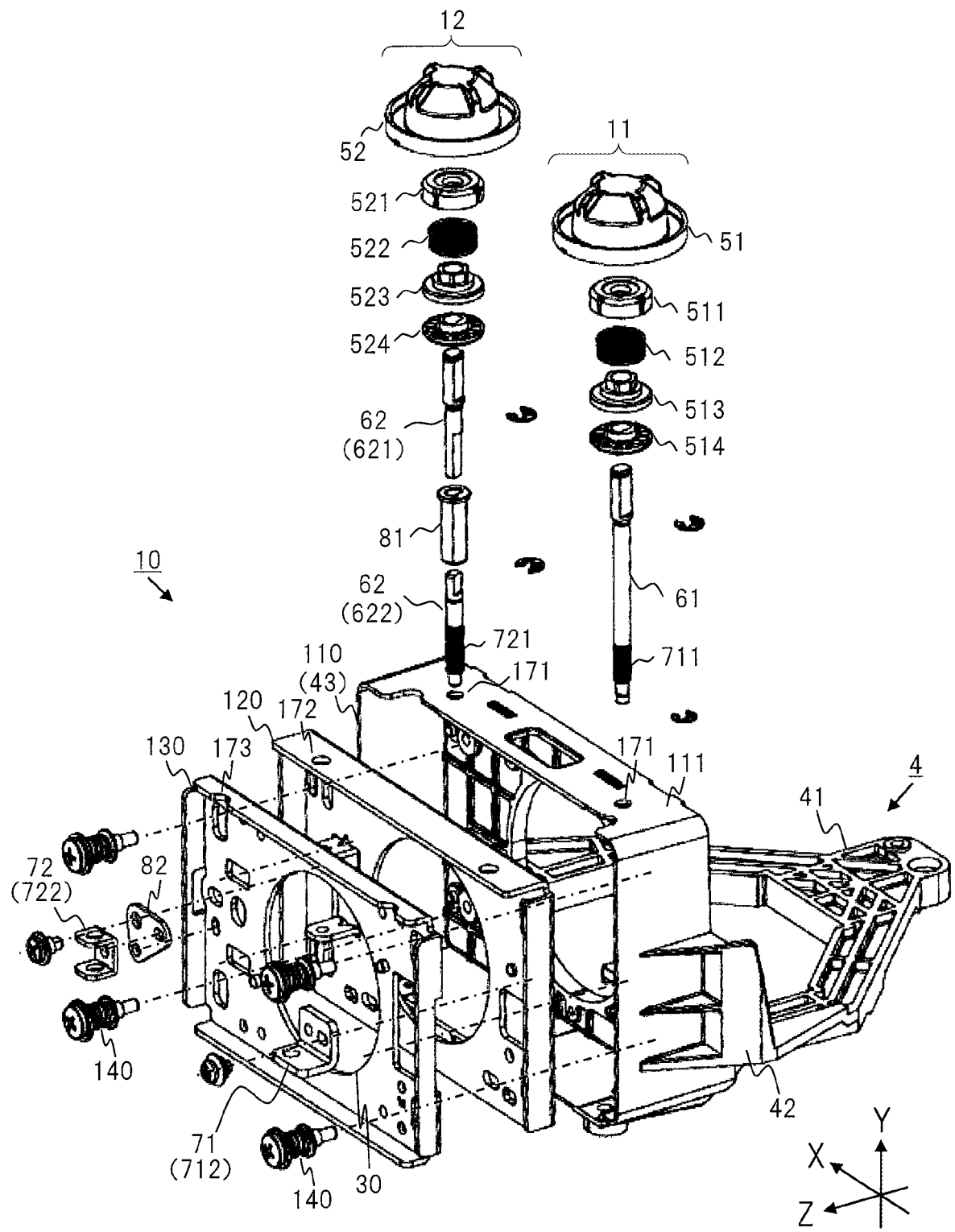
FIG. 7 is a perspective view showing a state where the lens shift mechanism according to the embodiment is disassembled.

The shaft receiving portion on the sidewall of each plate may be a hole or a notched portion, or may be constituted by a separate member extending in the Z direction from the X-Y planar portion. The shaft receiving portion may be provided on each plate, but at least one shaft receiving portion is only necessary for each shift portion, and the shaft receiving portions on the other plates may be omitted. FIGS. 5 and 6 each show an example in which the third base 130 is not provided with the top sidewall and shaft receiving portions. As a modification described below, FIG. 7 shows an example in which the third base 130 is provided with the top sidewall and notched portions serving as the shaft receiving portions.

In FIG. 6(B), a position H0 in the X direction corresponds to the center position of the X-Y planar portion and the hole 30 on the plate. A position H1 and a position H2 are positions at a predetermined distance to the right and left of the position H0. The position H1 indicates a position on which the first knob 51 and a central axis of the first shaft 61 are arranged. The position H2 indicates a position on which the second knob 52 and a central axis of the second shaft 62 are arranged. A position H3 and a position H4 indicate positions on which the biasing screw portions 140 are arranged. In addition, the first rotational direction 601 and the second rotational direction 602 are indicated as two separate rotational directions of the first knob 51. Likewise, the second knob 52 has two separate rotational directions. The first rotational direction 601 is a clockwise direction and the second rotational direction 602 is a counterclockwise direction when seen from above in the Z direction.

[Lens Shift Mechanism (3)_Outline of Actions]

An outline of actions of the lens shift mechanism 10 is as follows. First, an action of a vertical shift movement of the first shift portion 11 will be described. The user turns the first knob 51 in, for example, the first rotational direction 601 shown in FIG. 6(B). Then, the first shaft 61 rotates in the first rotational direction. The rotational torque is transmitted downward through the first shaft 61 in the Y direction. At this time, the positions of the first knob 51, the first shaft 61, and the like are maintained in the Y direction.

The first leadscrew portion 71 converts the rotational motion of the first shaft 61 into the rectilinear motion in the vertical direction. Thus, the female screw member 712 moves, for example, upward in the Y direction. The second base 120 to which the female screw member 712 is fixed moves upward in the Y direction together with the movement of the female screw member 712 with respect to the first base 110. At this time, the second base 120 moves in the Y direction with respect to the first base 110 while being guided along elongated grooves of the vertical guide portions described below extending in the Y direction.

The third base 130 connected in front of the second base 120 also moves upward in the Y direction together with the movement of the second base 120. The projection lens 31 fixed to the front of the third base 130 also moves upward in the Y direction together with the movement of the third base 130. At this time, the Y-direction movement of the third base 130 is absorbed by the coupling portion 81, whereby the positions of the members such as the second knob 52 provided above the coupling portion 81 in the Y direction are maintained in the Y direction.

In this manner, the projection lens 31 moves upward in the Y direction with respect to the first base 110. Likewise, when the user turns the first knob 51 in the second rotational direction 602 shown in FIG. 6(B), each of the second base 120, the third base 130, and the projection lens 31 moves downward in the Y direction.

Next, an action of a horizontal shift movement of the second shift portion 12 will be described. The user turns the second knob 52 in, for example, the first rotational direction. Then, the second shaft 62 rotates in the first rotational direction. The rotational torque is transmitted downward through the second shaft 62 in the Y direction. The coupling portion 81 allows the torque to be transmitted downward in the Y direction. At this time, the positions of the second knob 52, the second shaft 62, and the like are maintained in the Y direction.

The second leadscrew portion 72 converts the rotational motion of the second shaft 62 into the rectilinear motion in the vertical direction. Thus, the female screw member 722 moves, for example, upward in the Y direction. The link portion 82 having the first end portion connected to the female screw member 722 rotates about the rotation supporting shaft connected to the second base 120 together with the Y-direction movement of the female screw member 722. The link portion 82 converts the rectilinear motion in the Y direction into the rectilinear motion in the X direction and transmits it to the third base 130. At this time, the third base 130 connected to the second end portion of the link portion 82 moves to, for example, the right in X direction. In other words, the third base 130 relatively moves to the right in the X direction with respect to the second base 120. At this time, the third base 130 moves in the X direction with respect to the second base 120 while being guided along elongated grooves of the horizontal guide portions described below extending in the X direction. The projection lens 31 fixed to the front of the third base 130 also moves to the right in the X direction together with the movement of the third base 130 with respect to the second base 120.

In this manner, the projection lens 31 moves to the right in the X direction with respect to the first base 110. Likewise, when the user turns the second knob 52 in the second rotational direction, each of the third base 130 and the projection lens 31 moves to the left in the X direction.

[Lens Shift Mechanism (4)_Disassembled]

FIG. 7 is a perspective view showing a state where the lens shift mechanism 10 is disassembled. The holes 171 each configuring the corresponding shaft receiving portion are formed at positions on the left and right sides of the top sidewall 111 of the first base 110 in the X direction. The holes 172 each configuring the corresponding shaft receiving portion are formed at corresponding positions on the top sidewall of the second base 120. The notched portions 173 each configuring the corresponding shaft receiving portion are formed at corresponding positions on the top sidewall of the third base 130.

When assembling the lens shift mechanism 10, the first base 110, the second base 120, and the third base 130 are stacked and housed in this order and are fixed to one another with screws of the biasing screw portions 140 on the four corners of the plate, with the components of the first shift portion 11 and the second shift portion 12 being connected to the lens shift mechanism 10.

In FIG. 7, the female screw member 712 of the first leadscrew portion 71, the female screw member 722 of the second leadscrew portion 72, the link portion 82, and the like are shown on the front of the third base 130 in the Z direction.

As described above, the female screw member 712 has the first planar plate fixed to the second base 120 via the third base 130 with screws. The rotation supporting shaft of the link portion 82 is connected to the second base 120 via the hole on the third base 130. The female screw member 722 is connected to the first end portion of the link portion 82 with a pin or the like inserted into a hole on the first end portion. The third base 130 is connected to the second end portion of the link portion 82 with a pin or the like inserted into a hole on the second end portion.

In FIG. 7, the first shift portion 11 has the first knob 51, a subsidiary member 511, a spring 512, an upper clutch member 513, a lower clutch member 514, the first shaft 61, and the like as components arranged in this order from top to bottom in the Y direction. Members that configure a first clutch mechanism are installed inside the first knob 51. Members from the subsidiary member 511 to the lower clutch member 514 are connected around the axis of the first shaft 61 and are housed in the first knob 51.

Likewise, the second shift portion 12 has the second knob 52, a subsidiary member 521, a spring 522, an upper clutch member 523, a lower clutch member 524, the second shaft 62, and the like arranged in this order from top to bottom in the Y direction. Members that configure a second clutch mechanism are installed inside the second knob 52. Members from the subsidiary member 521 to the lower clutch member 524 are connected around the axis of the second shaft 62 and are housed in the second knob 52.

Specifically, the second shaft 62 is constituted by two separate rotation shaft portions that are a first rotation shaft portion 621 and the second rotation shaft portion 622 connected to each other via the coupling portion 81. A lower portion of the first rotation shaft portion 621 has a non-circular cross section such as a semicircular cross section. The coupling portion 81 is a cylindrical member and has a hollow portion having a non-circular cross section. The lower portion of the first rotation shaft portion 621 is inserted and fitted into the hollow portion from an upper end of the coupling portion 81. Likewise, an upper portion of the second rotation shaft portion 622 has a non-circular cross section. The upper portion of the second rotation shaft portion 622 is inserted and fitted into the hollow portion from the lower end of the coupling portion 81. Thus, the rotational torque is transmittable in the Y direction through the first rotation shaft portion 621, the coupling portion 81, and the second rotation shaft portion 622.

[Lens Shift Mechanism (5)_X-Y Planar Portion]

Figure 8:
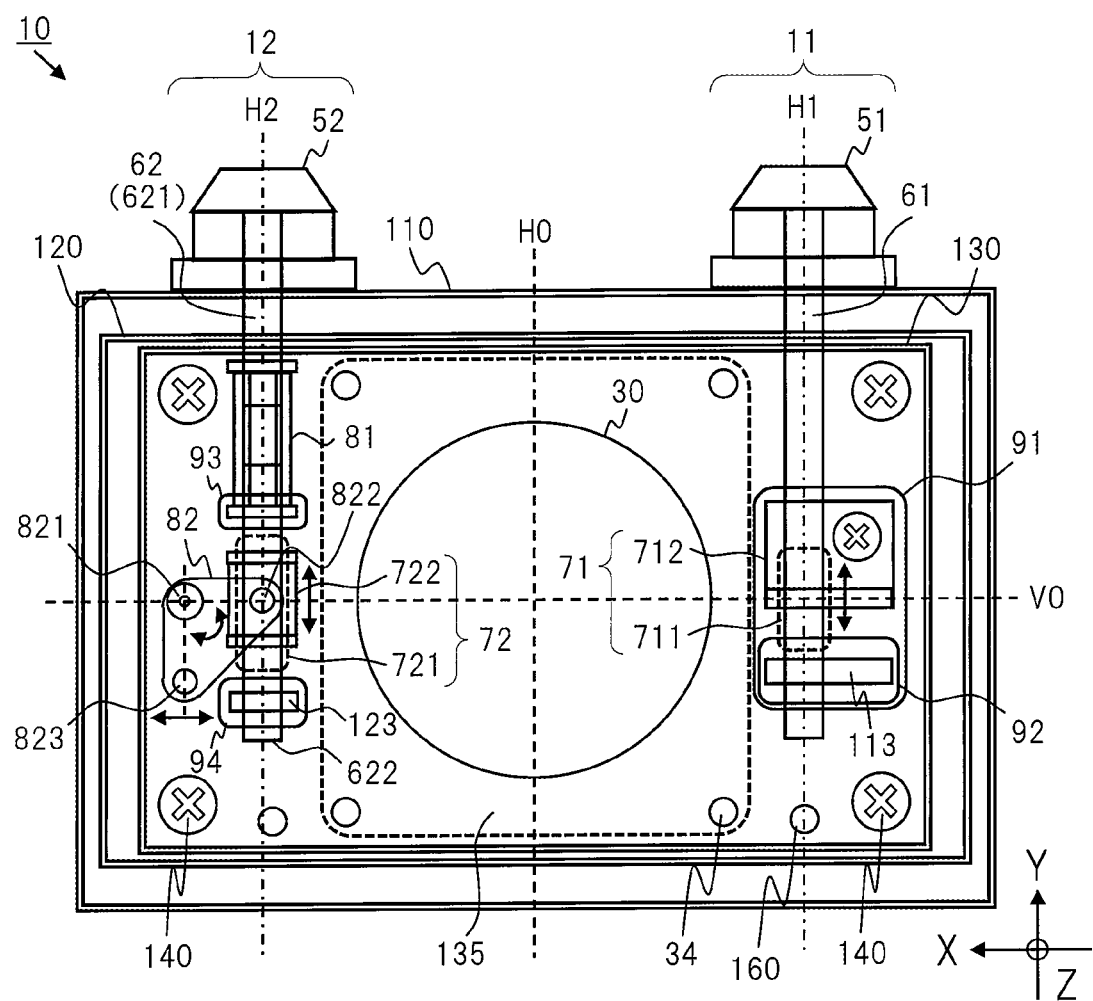
FIG. 8 is a schematic view showing a planar portion of the lens shift mechanism according to the embodiment, as seen from the front in a Z direction.

FIG. 8 is a schematic configuration showing the planar portion of the lens shift mechanism 10 of FIG. 5, as seen from the front in the Z direction. FIG. 8 shows a state where the lens shift mechanism 10 is at an intermediate position within an X-direction shift range and a Y-direction shift range. The lens shift mechanism 10 will be additionally described with reference to FIG. 8 and other drawings.

The hole 91 that allows the female screw member 712 of the first leadscrew portion 71 and the shaft receiving portion 113 to protrude to the front of the X-Y planar portion 135 is formed in a region to the right of the hole 30 on the third base 130. The hole 92 that is small enough to be arranged in the hole 91 and allows the shaft receiving portion 113 to protrude to the front of the X-Y planar portion 135 is formed in a region to the right of the hole 30 on the second base 120. The shaft receiving portion 113 provided on the first base 110 protrudes to the front of the X-Y planar portion 135 of the third base 130 through the hole 92 on the second base 120 and the hole 91 on the third base 130.

The male screw portion 711 that configures the first leadscrew portion 71 is provided close to the lower end of the first shaft 61 in the Y direction. The female screw member 712 has the first planar plate having an X-Y planar portion that is fixed to the second base 120 with screws. The female screw member 712 further has the second planar plate having an X-Z planar portion that extends in the X and Z directions and protrudes to the front of the X-Y planar portion 135 through the hole 91 on the third base 130. The female screw portion to which the male screw portion 711 is screwed is formed on the second planar plate of the female screw member 712. In FIG. 8, the second planar plate of the female screw member 712 is arranged at the position V0 in the Y direction.

The torque of the rotational motion of the first shaft 61 is transmitted to the first leadscrew portion 71, and this torque is transmitted from the male screw portion 711 to the female screw member 712 at the first leadscrew portion 71 and is converted into the rectilinear motion in the Y direction. This force in the Y direction is transmitted to the second base 120 through the female screw member 712. Thus, the female screw member 712 and the second base 120 move upward or downward in the Y direction within the Y-direction shift range. Additionally, the third base 130 also moves in the Y direction together with the second base 120. The Y-direction shift range is a predetermined range with the position V0 serving as its center.

The hole 94 that allows the shaft receiving portion 123 at the lower end of the second shaft 62 to protrude to the front of the X-Y planar portion 135 and the hole 93 that allows the shaft receiving portion at the lower end of the coupling portion 81 to protrude to the front of the X-Y planar portion 135 are formed in a region to the left of the hole 30 on the third base 130. The shaft receiving portion 123 provided on the second base 120 protrudes to the front of the X-Y planar portion 135 through the hole 94 on the third base 130. Likewise, the shaft receiving portion (the shaft receiving portion 124 described below) provided on the second base 120 and at the lower end of the coupling portion 81 protrudes to the front of the X-Y planar portion 135 through the hole 93 on the third base 130. The lower end of the coupling portion 81 is rotatably supported by this shaft receiving portion, and the position of the coupling portion 81 is fixed with respect to the second base 120.

In addition, a hole or the like for connecting the rotation supporting shaft 821 of the link portion 82 to the second base 120 is formed in a region to the right of the left side of the third base 130. In FIG. 8, the rotation supporting shaft 821 of the link portion 82 is arranged at position V0 in the Y direction.

The second shaft 62 is constituted by the upper first rotation shaft portion 621 and the lower second rotation shaft portion 622 connected to each other via the coupling portion 81. The lower end of the first rotation shaft portion 621 and the upper end of the second rotation shaft portion 622 are inserted into the hollow portion of the coupling portion 81 and are designed so as to be prevented from colliding with each other.

When the third base 130 moves in the Y direction together with the Y-direction movement of the second base 120, the second rotation shaft portion 622 of the second shaft 62 is subjected to a force to move in the Y direction through the second leadscrew portion 72 and the like. At this time, the Y-direction movement of the second rotation shaft portion 622 is absorbed by a gap inside the coupling portion 81, thereby maintaining the positions of the first rotation shaft portion 621 and the second knob 52 in the Y direction.

The male screw portion 721 that configures the second leadscrew portion 72 is provided close to the lower end of the second rotation shaft portion 622 of the second shaft 62 in the Y direction. The female screw member 722 has the first planar plate having an X-Y planar portion that is connected to the first end portion 822 of the link portion 82. In the female screw member 722, the female screw portion to which the male screw portion 721 is screwed is formed on one of the second planar plates each having an X-Z planar portion.

The torque of the rotational motion of the second shaft 62 is transmitted to the second leadscrew portion 72 through the coupling portion 81, and this torque is transmitted from the male screw portion 721 to the female screw member 722 at the second leadscrew portion 72 and is converted into the rectilinear motion in the Y direction. The female screw member 722 moves upward or downward within a predetermined Y-direction shift range. This force in the Y direction is transmitted from the female screw member 722 to the link portion 82.

The link portion 82 has the rotation supporting shaft 821 at an end portion of its right angle corner. The first end portion 822 at one of the two 45 degree angle portions of the link portion 82 is connected to the first planar plate of the female screw member 722 with a pin or the like, and the second end portion 823 is connected to the third base 130 with a pin or the like.

The first end portion 822 of the link portion 82 receives a force in the Y direction and rotates about the rotation supporting shaft 821 together with the Y-direction movement of the female screw member 722, thereby converting force into a force in the X direction for the second end portion 823. Thus, the third base 130 moves to the right and left in the X direction within the X-direction shift range through the second end portion 823. The X-direction shift range is a predetermined range with the position H0 serving as its center.

[Lens Shift Mechanism (6)_Vertical Shift Movement]

Figure 9:
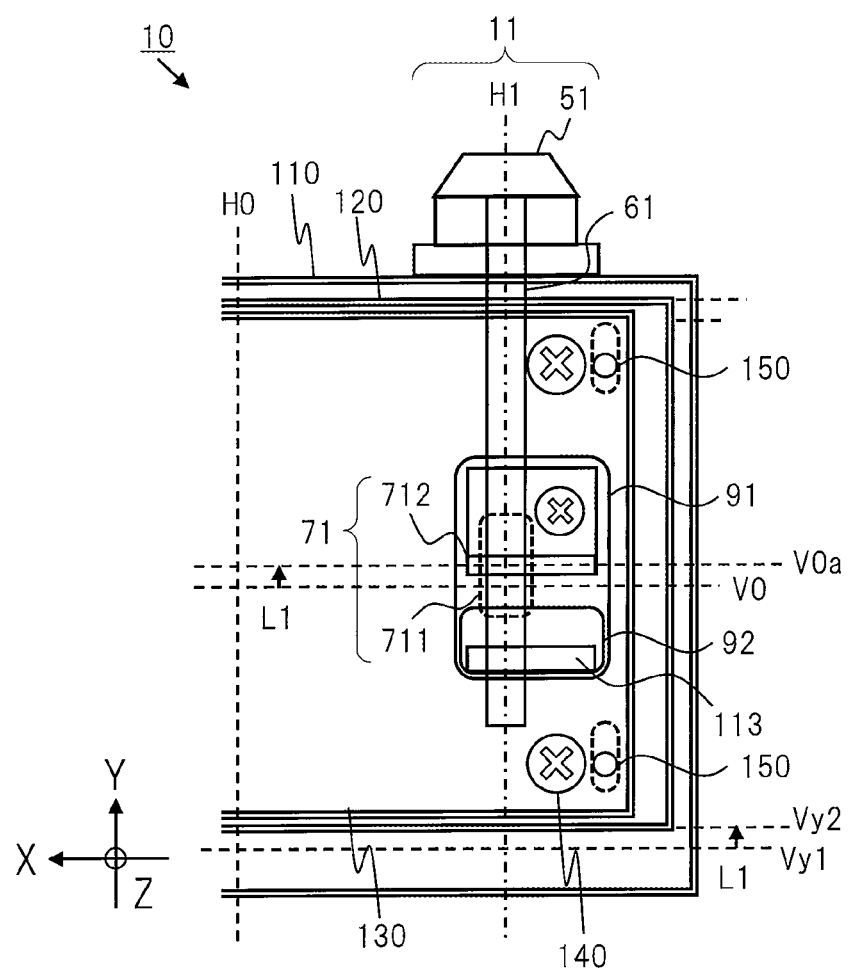
FIG. 9 is a schematic view showing a vertical movement of a first shift portion of the lens shift mechanism according to the embodiment.

FIG. 9 shows the Y-direction movement of the second base 120 at the first shift portion 11 of FIG. 8. FIG. 9 shows a state where the second base 120 is moved upward from the reference position in the Y direction. When the first knob 51 is turned in the first rotational direction, the female screw member 712 of the first leadscrew portion 71 moves upward in the Y direction together with a rotational action of the first shaft 61 in the first rotational direction. The position of the female screw member 712 shifts from the position V0 of FIG. 8 serving as a reference position to a position V0a of FIG. 9 at a distance L1. The second base 120 and the third base 130 also shift upward in the Y direction at the distance L1 together with this shift. For example, a lower end of the second base 120 shifts from a reference position Vy1 to a position Vy2 at the distance L1. The distance L1 is a distance within the vertical shift range. The relative position of the third base 130 with respect to the second base 120 does not change.

When the first knob 51 is turned in the second rotational direction, the second base 120 moves downward in the Y direction in a manner similar to the above-described manner.

The vertical shift range is defined by a length and the like of the groove of each of the vertical guide portions 150 provided on the plate. In FIG. 9, two of the vertical guide portions 150 provided in the regions on the four corners of the X-Y planar portion are indicated by dotted lines. As described below with reference to FIG. 11, each of the vertical guide portions 150 is constituted by a pin 151 on the first base 110 and a pin receiving groove 152 in the second base 120. The pin receiving groove 152 is an elongated hole extending in the Y direction and having a size corresponding to the Y-direction shift range.

[Lens Shift Mechanism (7)_Horizontal Shift Movement]

Figure 10:
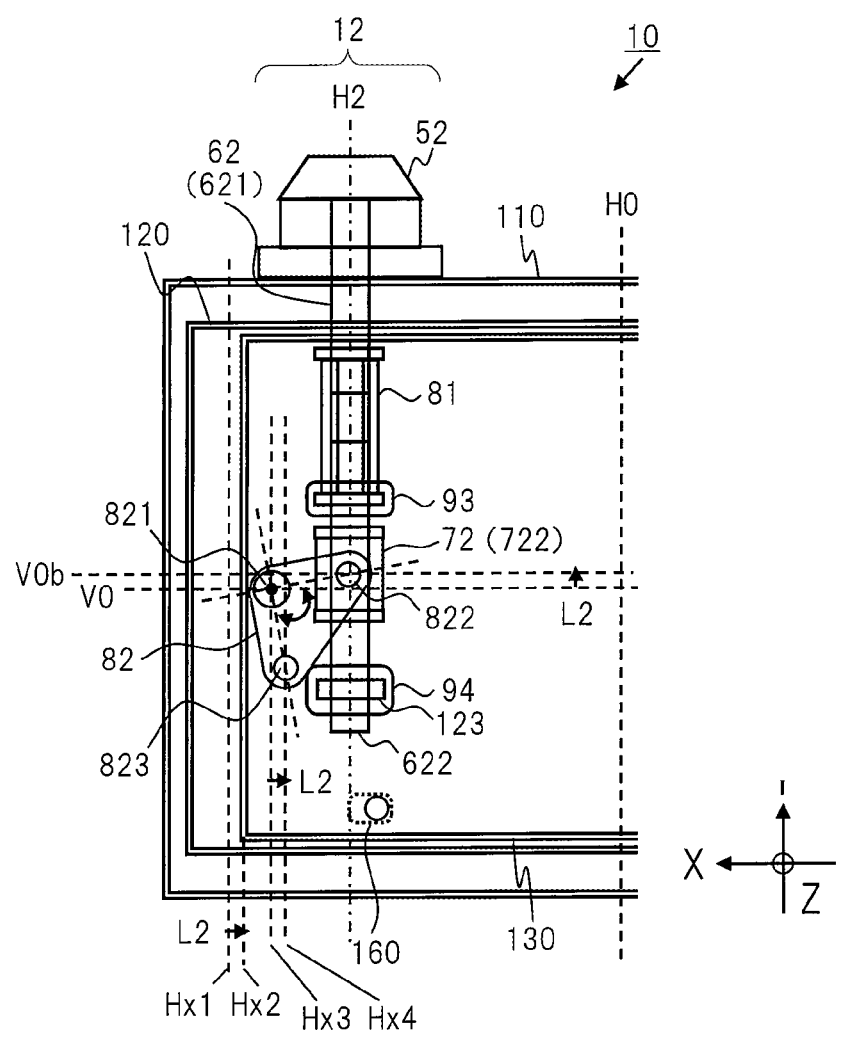
FIG. 10 is a schematic view showing a horizontal movement of a second shift portion of the lens shift mechanism according to the embodiment.

FIG. 10 shows the movement of the third base 130 at the second shift portion 12 of FIG. 8. FIG. 10 shows a state where the third base 130 is moved to the right in the X direction from the reference position. When the second knob 52 is turned in the first rotational direction, the female screw member 722 of the second leadscrew portion 72 and the first end portion 822 of the link portion 82 move upward in the Y direction together with a rotational action of the second shaft 62 in the first rotational direction. The positions of the female screw member 722 and the first end portion 822 shift from the position V0 of FIG. 8 serving as the reference position to the position V0b of FIG. 10 at a distance L2. At this time, as described above, the Y-direction movement of the second rotation shaft portion 622 is absorbed by the coupling portion 81.

At this time, the second end portion 823 of the link portion 82 shifts from a position Hx3 serving as a reference position in the X direction to a position Hx4 at the distance L1. Simultaneously, the third base 130 also shifts to the right in the X direction at the distance L2. For example, a left end of the third base 130 shifts from a reference position Hx1 to a position Hx2 at the distance L1. At this time, the positions of the first base 110, the second base 120, and the rotation supporting shaft 821 of the link portion 82 do not change.

When the second knob 52 is turned in the second rotational direction, the third base 130 moves to the left in the X direction in a manner similar to the above-described manner.

The horizontal shift range is defined by a length and the like of the groove of each of the horizontal guide portions 160 provided on the plate. In FIG. 10, one of the horizontal guide portions 160 provided in the regions on the four corners of the X-Y planar portion is indicated by dotted lines. As described below with reference to FIG. 12, each of the horizontal guide portions 160 is constituted by a pin 161 on the third base 130 and a pin receiving groove 162 in the second base 120. The pin receiving groove 162 is an elongated hole extending in the X direction and having a size corresponding to the X-direction shift range.

Note that, although the distance between the rotation supporting shaft 821 and the first end portion 822 and the distance between the rotation supporting shaft 821 and the second end portion 823 are equal to each other in the link portion 82 of the embodiment, the distances may be different from each other.

[Lens Shift Mechanism (8)_Vertical Positioning Portions]

Figure 11:
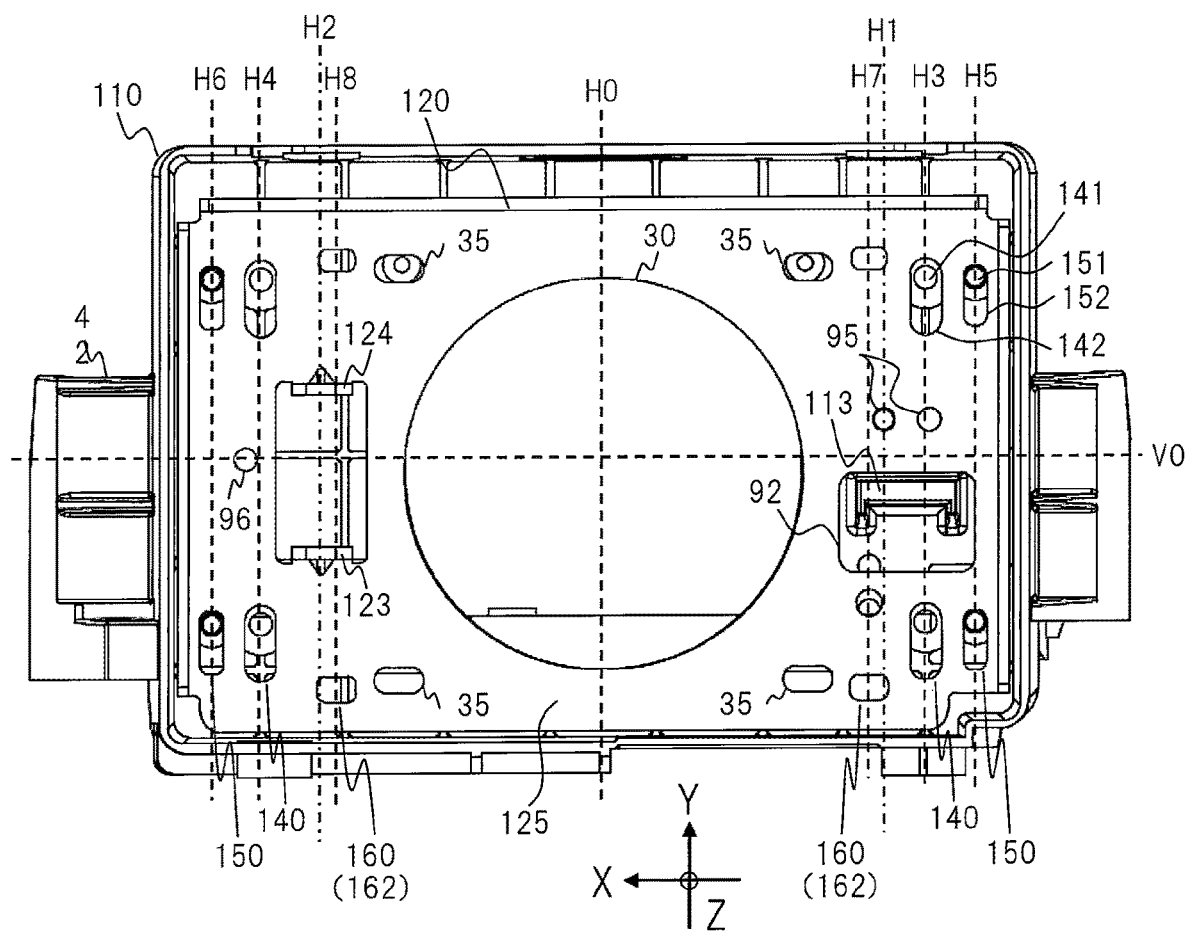
FIG. 11 is a diagram showing vertical positioning portions on planar portions of the first base and the second base of the lens shift mechanism according to the embodiment.

FIG. 11 shows configurations of vertical positioning portions of the first shift portion 11. FIG. 11 is a plan view of the lens shift mechanism 10, as seen from the front in the Z direction, and shows a state where the X-Y planar portion 125 of the second base 120 is stacked on the X-Y planar portion of the first base 110. In FIG. 11, configurations of the biasing screw portions 140, the vertical guide portions 150, the horizontal guide portions 160, and the like are shown on the X-Y planar portion 125. In addition, FIG. 11 shows a state where the second base 120 is moved downward in the Y direction to a maximum limit position within the shift range with respect to the first base 110 serving as the reference base.

The shaft receiving portion 123 of the underlying first base 110 protrudes from the hole 92 formed to the right of the hole 30 on the second base 120. Screw holes 95 for fixing the female screw member 712 with screws are formed above the hole 92 in the Y direction. In addition, the shaft receiving portion 123 of the second shaft 62 and the shaft receiving portion 124 at the lower end of the coupling portion 81 are provided to the left of the hole 30. A hole 96 through which the rotation supporting shaft 821 of the link portion 82 passes is formed in a region on the left side of the X-Y planar portion 125 at the position V0 at the center. A hole to which the rotation supporting shaft 821 is connected is formed at the corresponding position on the first base 110 behind the hole 96.

Escape holes 35 for fixing the projection lens 31 with screws are formed at four positions around the hole 30 on the second base 120 so as to correspond to the above-described holes 33 on the four corners of the flange 32 and the screw holes 34 on the third base 130. Each of the escape holes 35 is an elongated hole extending in the X direction and corresponding to the X-direction moving range of the third base 130.

The position H3 and the position H4 in the X direction indicate the positions of the biasing screw portions 140. Each of the biasing screw portions 140 is provided with a screw hole 141 on the first base 110 and a through hole 142 on the second base 120. The through hole 142 is an elongated hole extending in the Y direction and having a size corresponding to the Y-direction shift range of the second base 120. Although not shown, through holes corresponding to positions of the through hole 142 on the second base 120 are formed at predetermined positions on four corners of the third base 130.

The vertical guide portions 150 and the horizontal guide portions 160 are provided at positions away from the biasing screw portions 140. A position H5 and a position H6 indicate positions of the vertical guide portions 150. A total of four vertical guide portions 150 are provided at positions more outward than the biasing screw portions 140 and close to the left and right sides of the plate. The vertical guide portions 150 are each constituted by the pin 151 provided at the predetermined position on the first base 110 and the pin receiving groove 152 provided on the second base 120. The pin 151 is fitted into the pin receiving groove 152 in the Z direction. The pin receiving groove 152 is an elongated hole extending in the Y direction and having a size corresponding to the Y-direction shift range of the second base 120. When moving in the vertical direction by using the first shift portion 11, the pin receiving groove 152 of the second base 120 moves in the Y direction while being guided along the pin 151 of the first base 110.

A position H7 and a position H8 indicate positions of the horizontal guide portions 160. A total of four horizontal guide portions 160 are provided at positions more inward than the biasing screw portions 140 and closer to the hole 30. The horizontal guide portions 160 are each constituted by the pin receiving groove 162 provided on the second base 120 and the pin 161 provided on the third base 130 of FIG. 12.

The two shift portions that are the first shift portion 11 and the second shift portion 12 are individually arranged at positions on the right and left sides of the X-Y planar portion of the plate in the X direction. The first shift portion 11 is a primary shaft that is a drive side in regard to the vertical shift movement, and the second shift portion 12 is a secondary shaft. A line of the position H1 corresponds to the primary shaft for a drive of the vertical movement by the first shift portion 11. In contrast, a line of the position H2 corresponds to the secondary shaft in regard to this vertical movement. A space in the X direction between the hole such as the through hole 142 and each of the two biasing screw portions 140 at upper right and lower right corners corresponding to the primary shaft is designed to be relatively small. A space in the X direction between the hole such as the through hole 142 and each of the two biasing screw portions 140 at upper left and lower left corners corresponding to the secondary shaft is designed to be relatively large. In addition, the vertical guide portions 150 on the position H5 side corresponding to the first shift portion correspond to the primary shaft, and the vertical guide portions 150 on the position H6 side correspond to the secondary shaft. A gap formed when the pin 151 is fitted into the pin receiving groove 152 of each of the vertical guide portions 150 on the position H5 side is designed to be relatively small, whereas a gap formed when the pin 151 is fitted into the pin receiving groove 152 on the position 56 side is designed to be relatively large.

[Lens Shift Mechanism (9)_Horizontal Positioning Portions]

Figure 12:
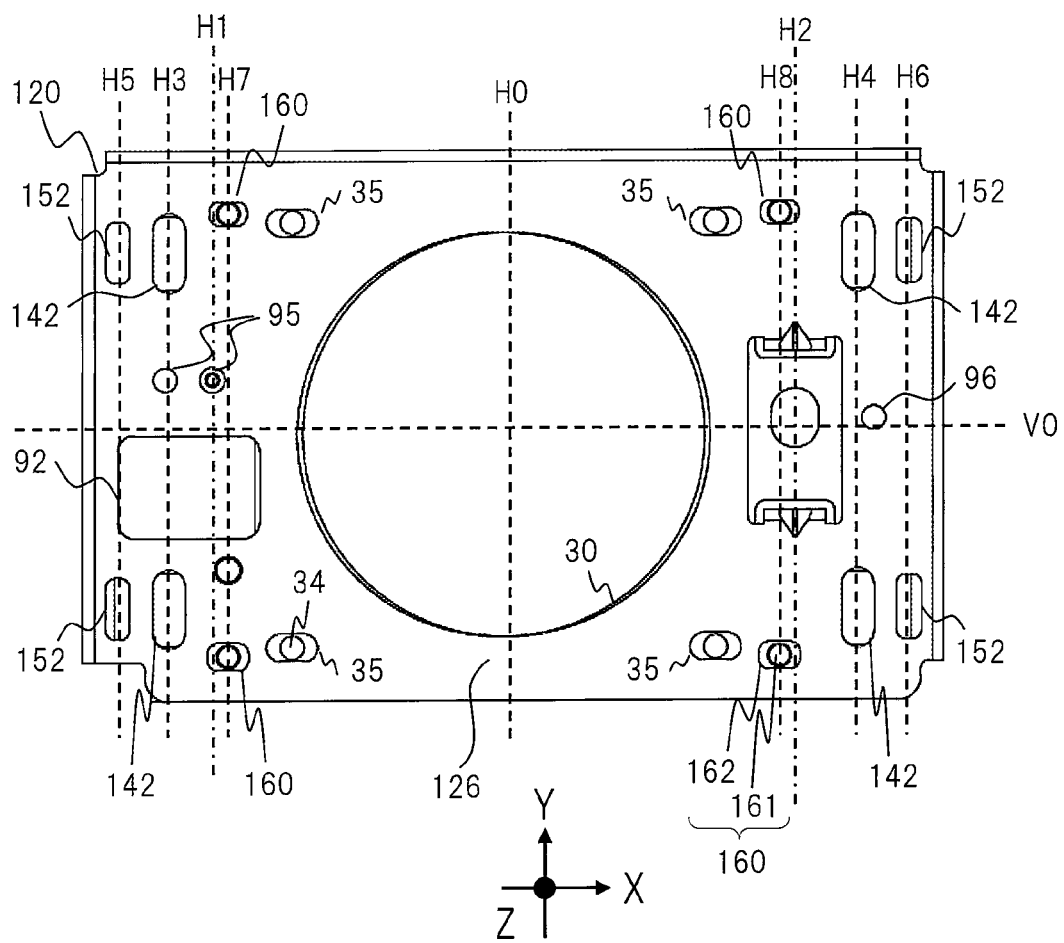
FIG. 12 is a diagram showing horizontal positioning portions on planar portions of vertical and horizontal plates of the lens shift mechanism according to the embodiment.

FIG. 12 shows configurations of horizontal positioning portions of the second shift portion 12. FIG. 12 is a plan view of a rear side of an X-Y planar portion 126 of the second base 120, as seen from the rear in the Z direction, and shows a state where the third base 130 is stacked behind this X-Y planar portion 126. In FIG. 12, configurations of the biasing screw portions 140, the vertical guide portions 150, the horizontal guide portions 160, and the like are shown on the X-Y planar portion 126. In addition, FIG. 12 shows a state where the third base 130 is at the intermediate position within the X-direction shift range with respect to the second base 120.

The screw holes 34 for fixing the projection lens 31 with screws are formed on the third base 130 at positions corresponding to the four positions of the escape holes 35 arranged around the hole 30 on the second base 120.

The hole 96 to which the above-described rotation supporting shaft 821 is connected is formed in the region of the position V0 on the X-Y planar portion 126 of the second base 120, and the above-described hole through which the rotation supporting shaft 821 passes is formed at the corresponding position on the third base 130 behind the hole 96. This hole is an elongated hole extending in the X direction and corresponding to the X-direction moving range of the third base 130.

The horizontal guide portions 160 are each constituted by the pin receiving groove 162 formed at a predetermined position on the X-Y planar portion 126 of the second base 120 and the pin 161 provided at the corresponding position on the third base 130. The pin 161 is fitted into the pin receiving groove 162 in the Z direction. The pin receiving groove 162 is an elongated hole extending in the X direction and having a size corresponding to the X-direction shift range of the third base 130. When moving in the horizontal direction by using the second shift portion 12, the pin 161 of the first base 110 moves in the X direction while being guided along the pin receiving groove 162 of the second base 120.

[Clutch Mechanism]

The clutch mechanism will be described with reference to FIGS. 13(A) and 13(B). This clutch mechanism is a torque limiter mechanism that blocks the torque from being transmitted in the Y direction when in an overload state, that is, when the rotational torque exceeds a predetermined value, thereby causing the knob to idly rotate. The overload state corresponds to a state in which the user attempts to turn the knob beyond a limit position of the shift range.

FIGS. 13(A) and 13(B) each show a configuration of the first clutch mechanism of the first shift portion 11 and the second clutch mechanism of the second shift portion 12 of FIG. 7. The first clutch mechanism and the second clutch mechanism have structures that are similar to each other, and in FIGS. 13(A) and 13(B), the first clutch mechanism of the first shift portion 11 will be described by way of example. FIGS. 13(A) and 13(B) each show a cross-section of the first shaft 61 of the first knob 51 in an X-Y plane extending through the central axis of the first shaft 61. FIG. 13(A) shows the clutch mechanism in a normal state, and FIG. 13(B) shows the clutch mechanism in the overload state, in other words, a torque restricting state.

In FIG. 13(A), the first knob 51, the subsidiary member 511, the upper clutch member 513, the lower clutch member 514, and the first shaft 61 are arranged in this order in which the force is transmitted in the Y direction. In the normal state, the torque is effectively transmitted through these members from top to bottom in the Y direction. The first shaft 61 and the like including the clutch mechanism are rotatable in two rotational directions that are the first rotational direction and the second rotational direction.

In each of the FIGS. 13(A) and 13(B), the shape of the first knob 51 is shown in a simplified manner. The first knob 51 is constituted by a member having a shape and made of a material that can easily be held by the user's hand. An inside of the first knob 51 is provided with a hollow portion having a shape suitable for housing the members that configure the clutch mechanism. The subsidiary member 511 is arranged below an upper surface of the first knob 51 in the Y direction, inside the first knob 51, and around the first shaft 61. The subsidiary member 511 is a member that configures a base of the first knob 51 and is provided for a suitable connection between the first knob 51 and the main members of the clutch mechanism. The subsidiary member 511 receives an elastic force of the clutch spring 512 in the Y direction.

An E-type retaining ring 1301 for fixing the members is arranged around the first shaft 61 and between the first knob 51 and the subsidiary member 511.

The subsidiary member 511 has an upper cylindrical portion having a first diameter and a lower cylindrical portion having a second diameter that is greater than the first diameter, with a disc interposed therebetween. An inner surface of the first knob 51 and an outer peripheral surface of the upper portion of the subsidiary member 511 are fixed to each other in a state where no sliding occurs in the rotational direction about the shaft.

The clutch spring 512 is arranged on an outer peripheral surface of the lower portion of the subsidiary member 511. An upper end of the clutch spring 512 abuts on the disc interposed between the upper portion and lower portion of the subsidiary member 511. A lower end of the clutch spring 512 abuts on a disc of the upper clutch member 513.

The upper clutch member 513 is arranged below the subsidiary member 511 and the clutch spring 512 and around the first shaft 61. The upper clutch member 513 has an upper cylindrical portion having a first diameter and the lower disc portion having a second diameter that is greater than the first diameter. An inner peripheral surface of the lower portion of the subsidiary member 511 is fixed to an outer peripheral surface of the upper portion of the upper clutch member 513 so as to be movable in the Y direction and be in a state where no sliding occurs in the rotational direction. The lower portion of the subsidiary member 511 and the upper portion of the upper clutch member 513 have, for example, a hexagonal cross section as shown in FIG. 7, and the lower portion of the subsidiary member 511 is fitted into the upper portion of the upper clutch member 513. Therefore, when the first knob 51 is turned, the upper clutch member 513 also performs a rotational action via the subsidiary member 511.

The lower clutch member 514 is arranged below the upper clutch member 513 and around the first shaft 61. The lower clutch member 514 has an upper disc portion having a second diameter and a lower cylindrical portion having a first diameter that is less than the second diameter. The second diameter of the upper clutch member 513 is equal to the second diameter of the lower clutch member 514. The lower portion of the lower clutch member 514 is connected around the second shaft 62 in a state where no sliding occurs in the rotational direction. An E-type retaining ring 1302 for fixing the members is arranged below the lower clutch member 514 and around the first shaft 61.

A claw portion 1311 facing downward in the Y direction for engagement is formed on a circumferential portion of the lower disc portion of the upper clutch member 513. Correspondingly, a claw portion 1312 facing upward in the Y direction for engagement is formed on a circumferential portion of the upper disc portion of the lower clutch member 514. A groove extending in a radial direction is formed on each of the claw portion 1311 and the claw portion 1312, so that a plurality of claws aligned in a circumferential direction are formed. Each of the claws has, for example, a trapezoidal shape.

In the normal state, the claw portion 1311 of the upper clutch member 513 and the claw portion 1312 of the lower clutch member 514 are in an engaged state. In other words, the upper clutch member 513 and the lower clutch member 514 are connected to each other in a state where no sliding occurs in the rotational direction, and the torque is effectively transmitted to the lower clutch member 514 together with a rotation of the upper clutch member 513.

In FIG. 13(B), when the user attempts to turn the first knob 51 beyond the limit position of the shift range, the rotational torque transmitted from the first knob 51 to the upper clutch member 513 via the subsidiary member 511 exceeds a predetermined value. In this case, the state shown in FIG. 13(A) is switched to the state shown in FIG. 13(B). In the overload state of FIG. 13(B), the claw portion 1311 of the upper clutch member 513 and the claw portion 1312 of the lower clutch member 514 are in a disengaged state in which sliding in the rotational direction occurs. Each claw on the claw portion 1311 of the upper clutch member 513 slides over each claw on the claw portion 1312 of the lower clutch member 514 and moves in the rotational direction while the lower clutch member 514 stays still. At this time, the upper clutch member 513 moves slightly upward in the Y direction every time the claw slides over the other claw. The clutch spring 512 is flexed and causes the elastic force to generate in the Y direction. The subsidiary member 511 receives this elastic force. The upper clutch member 513 is pushed back toward the lower clutch member 514 by this elastic force.

In the above-described disengaged state, the torque is blocked from being transmitted through the first shaft 61 in the Y direction, thereby causing the first knob 51 to idly rotate. Thus, load on the members that configure the lens shift mechanism 10 is suppressed, breakage or the like of the members is prevented, and the position of the projection lens 31 is maintained without disturbance.

The above-described first clutch mechanism is composed such that its components are collectively housed in the first knob 51 and are arranged so as to be coaxial with the first shaft 61. For this reason, the space occupied by the clutch mechanism of the embodiment is small, thereby contributing to the miniaturization of the projection type image display apparatus.

As a modification of the clutch mechanism, the first knob 51 and the subsidiary member 511 may be composed as an integral member. In addition, the upper clutch member 513 and the lower clutch member 514 are not limited to be constituted by the mechanism of FIG. 13 and may be constituted by a different mechanism.

[Effects and the Like]

As described above, the manual-type lens shift mechanism according to the embodiment of projection type image display apparatus can be achieved in a space-saving manner, thereby making it possible to achieve a compact and low-cost apparatus. According to the lens shift mechanism of the embodiment, the main components including the clutch mechanism are collectively arranged in a region coaxial with the rotation shaft of the knob of each shift portion. For this reason, the lens shift mechanism of the embodiment has a simpler structure, has less components, and occupies less space in the housing compared to the prior art, thereby making it possible to achieve a low-cost lens shift mechanism in a space-saving manner. Thus, the housing of the projection type image display apparatus can be miniaturized to achieve a low-cost apparatus.

In particular, in this embodiment, the clutch mechanism is installed inside the knob that is the manual operation portion, and it is unnecessary to provide a member such as the gear or the cam at a position away from the rotation shaft in a radial direction. Thus, a clutch mechanism can be achieved in a more space-saving manner than the prior art while achieving a suitable torque limiter function capable of preventing breakage or the like of the members in regard to the lens shift function.

In addition, the lens shift mechanism of the embodiment is constituted by the first shift portion 11 and the second shift portion 12 individually arranged at positions on the right and left sides of the plate in the X direction with respect to the projection lens 31 at the center position of the plate. Thus, a width of the housing in the Y direction can be reduced as compared to a housing having a configuration in which all mechanisms and their components are provided at the center position of the plate, thereby contributing to the miniaturization of the apparatus.

MODIFICATION

A modification of the embodiment of the projection type image display apparatus will be described below. The modification of the lens shift mechanism of the projection type image display apparatus has components that differ in configuration from the above-described embodiment in the following manner. The lens shift mechanism in regard to the mechanism of the second shift portion 12 has the rotation supporting shaft 821 of the link portion 82 that is not connected to the second base 120 but is instead connected to the first base 110. In addition, the shaft receiving portion 123 of the second shaft 62 and the shaft receiving portion at the lower end of the coupling portion 81 are not provided on the second base 120 but are instead provided on the first base 110.

A hole through which the rotation supporting shaft 821 of the link portion 82 passes is formed on each of the third base 130 and the second base 120 so as to correspond to the position of the rotation supporting shaft 821. The hole to which the rotation supporting shaft 821 is connected is formed at the corresponding position on the first base 110. In addition, a hole through which the member such as the shaft receiving portion 123 of the second shaft 62 passes is formed on each of the third base 130 and the second base 120 so as to correspond to a position of the shaft receiving portion 123 of the second shaft 62 and the like.

The above-described holes on the second base 120 and the third base 130 are each formed as an escape hole having a size larger than or equal to the X-direction shift range and the Y-direction shift range. For example, the hole at the position corresponding to the rotation supporting shaft 821 on the third base 130 is formed as an escape hole extending in the X and Y directions and having a sufficient size so as to allow the X-direction movement and the Y-direction movement of the third base 130.

In this modification, when the second knob 52 is turned, the first end portion 822 of the link portion 82 moves in the Y direction together with the Y-direction movement of the female screw member 722 of the second leadscrew portion 72. Accordingly, the link portion 82 rotates about the rotation supporting shaft 821, and the third base 130 connected to the second end portion 823 moves in the X direction. In other words, the third base 130 relatively moves in the X direction with respect to the first base 110. In this modification, it is unnecessary to provide the coupling portion 81, the second shaft 62 can be composed of one component as in the first shaft 61, and accordingly, the cost of the apparatus can be reduced.

In the foregoing, the present invention has been concretely described based on the embodiment. However, the present invention is not limited to the foregoing embodiment, and various modifications and alterations can be made without departing from the scope of the present invention.

LIST OF REFERENCE SIGNS

1: housing
2: optical unit
3: projection optical system
4: common base
5: screen
10: lens shift mechanism
11: first shift portion
12: second shift portion
30: hole
31: projection lens
43: fixing base
51: first knob
52: second knob
61: first shaft
62: second shaft
71: first leadscrew portion
72: second leadscrew portion
81: coupling portion
82: link portion
110: first base
120: second base
130: third base

The invention claimed is:

1. A projection type image display apparatus comprising:
a projection lens; and
a lens shift mechanism for moving the projection lens in each of vertical and horizontal directions with respect to an optical axis based on a manual operation of a user,
wherein the lens shift mechanism includes:
　a first base fixed to a housing of the projection type image display apparatus;
　a second base connected to the first base so as to be relatively movable in the vertical direction with respect to the first base;
　a third base connected to the second base so as to be relatively movable in the horizontal direction with respect to the second base, and to which the projection lens is fixed;
　a first shift portion which moves the projection lens in the vertical direction by moving the second base in the vertical direction with respect to the first base based on the manual operation; and
　a second shift portion which moves the projection lens in the horizontal direction by moving the third base in the horizontal direction with respect to the second base based on the manual operation,
the first shift portion is arranged along the vertical direction so as to be coaxial with a first manual operation portion and a first rotation shaft, and
the second shift portion is arranged along the vertical direction so as to be coaxial with a second manual operation portion and a second rotation shaft,
wherein the first shift portion includes a first clutch mechanism which is arranged inside the first manual operation portion so as to be coaxial with the first rotation shaft and restricts a torque of the first rotation shaft from being transmitted in the vertical direction when the torque exceeds a predetermined value, and
the second shift portion includes a second clutch mechanism which is arranged inside the second manual operation portion so as to be coaxial with the second rotation shaft and restricts a torque of the second rotation shaft from being transmitted in the vertical direction when the torque exceeds a predetermined value.

2. A projection type image display apparatus comprising:
a projection lens; and
a lens shift mechanism for moving the projection lens in each of vertical and horizontal directions with respect to an optical axis based on a manual operation of a user,
wherein the lens shift mechanism includes:
　a first base fixed to a housing of the projection type image display apparatus;
　a second base connected to the first base so as to be relatively movable in the vertical direction with respect to the first base;
　a third base connected to the second base so as to be relatively movable in the horizontal direction with respect to the second base, and to which the projection lens is fixed;
　a first shift portion which moves the projection lens in the vertical direction by moving the second base in the vertical direction with respect to the first base based on the manual operation; and
　a second shift portion which moves the projection lens in the horizontal direction by moving the third base in the horizontal direction with respect to the second base based on the manual operation,
the first shift portion is arranged along the vertical direction so as to be coaxial with a first manual operation portion and a first rotation shaft, and
the second shift portion is arranged along the vertical direction so as to be coaxial with a second manual operation portion and a second rotation shaft,
wherein the first shift portion includes:
　the first manual operation portion arranged outside of the first base;
　the first rotation shaft arranged in front of the third base; and
　a first transmitting portion which is connected to the second base and converts a rotational motion of the first rotation shaft into a rectilinear motion in the vertical direction, and
the second shift portion includes:
　the second manual operation portion arranged outside of the first base;
　the second rotation shaft arranged in front of the third base;
　a second transmitting portion which converts a rotational motion of the second rotation shaft into a rectilinear motion in the vertical direction; and
　a direction converting portion which is connected to the third base and the second transmitting portion and converts the rectilinear motion of the second transmitting portion in the vertical direction into a rectilinear motion in the horizontal direction, wherein the direction converting portion includes a rotation supporting shaft, a first end portion, and a second end portion, the rotation supporting shaft is connected to the first base via a hole on the third base and a hole on the second base, the first end portion is connected to the second transmitting portion with a rotatable link, and the second end portion is connected to the third base with a rotatable link.

* * * * *